US008783469B2

(12) United States Patent
Beutl et al.

(10) Patent No.: US 8,783,469 B2
(45) Date of Patent: Jul. 22, 2014

(54) ROLL SORTER DEVICE AND SORTING METHOD FOR SORTING PREFORMS AND TRANSPORT DEVICE WITH SUCH A ROLL SORTER DEVICE

(75) Inventors: Juergen Beutl, Reichenstetten (DE); Andreas Seidl, Donaustauf (DE); Martin Seger, Neumarkt i. d. Opf. (DE); Joerg Michel, Schwarzenbach a. W. (DE); Juergen Lehner, Alteglofsheim (DE); Bernd Eichler, legal representative, Wallenfels (DE)

(73) Assignee: Krones AG, Neutraubling (DE)

( * ) Notice: Subject to any disclaimer, the term of this patent is extended or adjusted under 35 U.S.C. 154(b) by 270 days.

(21) Appl. No.: 13/026,855

(22) Filed: Feb. 14, 2011

(65) Prior Publication Data
US 2011/0198270 A1  Aug. 18, 2011

(30) Foreign Application Priority Data

Feb. 17, 2010  (DE) .......................... 10 2010 008 367

(51) Int. Cl.
 *B07C 5/00* (2006.01)
(52) U.S. Cl.
 USPC .......................................... 209/523; 209/522
(58) Field of Classification Search
 USPC .......... 209/522–525, 530, 657, 658; 198/444; 425/534
 See application file for complete search history.

(56) References Cited

U.S. PATENT DOCUMENTS

| | | | |
|---|---|---|---|
| 2,377,431 A | 6/1945 | Lakso | |
| 3,260,364 A * | 7/1966 | England | 209/668 |
| 3,739,909 A * | 6/1973 | Garland et al. | 209/668 |
| 4,223,778 A * | 9/1980 | Kontz | 198/389 |
| 4,244,459 A * | 1/1981 | Garrett | 198/389 |
| 4,469,229 A * | 9/1984 | Cronan | 209/544 |
| 5,186,307 A | 2/1993 | Doudement et al. | |
| 6,575,305 B1 * | 6/2003 | Casagrande | 209/616 |
| 6,968,936 B2 | 11/2005 | Charpentier | |
| 7,318,722 B2 * | 1/2008 | Drysdale | 425/534 |
| 7,556,137 B2 | 7/2009 | Charpentier | |

(Continued)

FOREIGN PATENT DOCUMENTS

| | | |
|---|---|---|
| DE | 42 02 735 A1 | 8/1993 |
| DE | 692 00 939 T2 | 4/1995 |

(Continued)

OTHER PUBLICATIONS

European Search Report dated Jun. 20, 2011, issued in counterpart European Application No. 11154755.0.

*Primary Examiner* — Joseph C Rodriguez
(74) *Attorney, Agent, or Firm* — Novak Druce Connolly Bove + Quigg $^{LLP}$

(57) ABSTRACT

A roll sorter device has a first roll that can be driven rotatably about its roll axis and a second roll that can be driven rotatably about its roll axis opposite the rotation of the first roll. The second roll is arranged spaced from the first roll such that the roll axes of the first and second rolls are arranged substantially parallel to each other. The roll sorter device may include a detection device for detecting seized and/or faulty preforms on the first or second roll and a roll arrangement modification element to modify the arrangement of the first and second rolls to each other when the detection device detects seized preforms. A sorting method for sorting performs and a transport device may employ the aforementioned roll sorter device.

22 Claims, 5 Drawing Sheets

(56) References Cited

U.S. PATENT DOCUMENTS

| | | |
|---|---|---|
| 8,109,381 B2 * | 2/2012 | Deyerl .......................... 198/389 |
| 2004/0109747 A1 | 6/2004 | Charpentier |
| 2008/0226763 A1 | 9/2008 | Charpentier |
| 2009/0095598 A1 * | 4/2009 | Stoiber et al. ................ 198/617 |
| 2011/0108468 A1 * | 5/2011 | Tanner .......................... 209/524 |
| 2011/0120833 A1 * | 5/2011 | Tanner .......................... 198/444 |
| 2013/0001139 A1 * | 1/2013 | Tanner .......................... 209/552 |

FOREIGN PATENT DOCUMENTS

| | | |
|---|---|---|
| DE | 10 2009 009 866 A1 | 8/2010 |
| DE | 10 2009 016 593 A1 | 10/2010 |
| EP | 2 221 261 A1 | 8/2010 |
| FR | 2 864 050 A1 | 6/2005 |
| JP | 2005-219906 A | 8/2005 |
| WO | 02/36466 A1 | 5/2002 |
| WO | 2005/070793 A1 | 8/2005 |

\* cited by examiner

ROLL SORTER DEVICE AND SORTING METHOD FOR SORTING PREFORMS AND TRANSPORT DEVICE WITH SUCH A ROLL SORTER DEVICE

CROSS-REFERENCE TO RELATED APPLICATION

This application claims the benefit of priority of German Patent Application No. 10 2010 008 367.4, filed Feb. 17, 2010, pursuant to 35 U.S.C. 119(a)-(d), the disclosure of which is incorporated herein by reference.

TECHNICAL FIELD

The present disclosure relates to a roll sorter device and a sorting method for sorting preforms, and to a transport device with such a roll sorter device.

BACKGROUND

Preforms of plastic such as for example polyethylene terephthalate (PET), polypropylene (PP) etc. are used in particular in the drinks industry for the production of containers, for example bottles. The preforms are supplied to the container handling plants which heat the preforms in a heating device in order then to expand and stretch them into plastic containers in a blow-mounding machine using a blow-moulding process. The plastic containers are then transported by means of a transport system to further treatment devices such as for example a cleaning apparatus, a labelling apparatus, a filling apparatus, a sorting apparatus, a packing apparatus etc.

The preforms are usually first supplied to the container processing plants unsorted. Unsorted here means that the preforms are first passed to a receiver apparatus in which, although usually preforms of the same type such as size, material etc. are present, the preforms can be oriented in any direction in relation to each other. To process the preforms in the container processing plant, the preforms must however all be aligned in a predetermined direction to each other. To this end roll sorter devices for example are used in the prior art.

US 2004/0109747 A1 describes a system for supplying preforms in particular for a container blowing machine. This system has a filling hopper, on the base of which are arranged two substantially parallel rolls which rotate about their respective axes. The gap between the two rolls is dimensioned such that it is greater than the diameter of the body of the preforms placed in the filling hopper but is smaller than the diameter of the neck ring of the preforms in the filling hopper. As the diameter of the body of the preforms is smaller than the diameter of the neck ring of the preforms, preforms which fall through the gap with their body first are suspended by their neck ring on the two rolls. Preforms which for example remain lying completely on the rolls are pushed off the rolls via a pusher wheel arranged above and transverse to the axis of the two rolls so that the two rolls only transport preforms which are aligned next to each other in one direction.

However, seized preforms cannot be removed from the two rolls with such a roll sorter device.

It may be desirable to provide an improved roll sorter device and an improved sorting method for sorting preforms and a transport device with such a roll sorter device that can economically also remove seized preforms from the two rolls of the roll sorter device.

SUMMARY

According to various aspects of the disclosure, a roll sorter device serves to sort preforms and has a first roll which can be driven rotatably about its roll axis, a second roll which can be driven rotatably about its roll axis in particular in the opposite direction to rotation of the first roll. The second roll is arranged spaced from the first roll such that the roll axes are essentially parallel to each other. The device includes a detection device to detect seized and/or faulty preforms on the first and second roll and a roll arrangement modification element to modify the arrangement of the first and second rolls to each other when the detection device detects seized preforms.

A modification of the arrangement of the first and second rolls to each other means in particular that at least one section of one of the two rolls is modified in its position in relation to the other roll. Thus a shift is possible in the direction of the rotary axes of the rolls, but also it is possible for the distance of at least one section of a roll from the other roll to be changed.

In some aspects, the roll arrangement modification element is designed to shift the first and second roll in relation to each other by a predetermined distance.

In processing different preforms with different diameters or neck rings, fundamental spacing changes are possible for adaptation to the geometry of the preforms, and in some aspects an automatic adjustment of the second roll and/or also the first roll can take place. The term stationary roll relates therefore only to the position during operation and not to a general presetting of the roll spacing.

It may be advantageous if the roll arrangement modification element is designed to swivel part of the first roll away from the second roll. Here the first roll is divided by means of a cardan shaft into two parts, wherein the one part of the first roll can be driven in rotation about its roll axis by means of the cardan shaft and the other part of the first roll can be swivelled on the cardan shaft out of the direction of its roll axis and away from the second roll.

It is also possible that the first roll has a roll arrangement modification element as a unit and this unit comprises a chamfered which is decoupled from the rotation of the first roll.

The unit can be designed such that a rotary movement by a predetermined angle about the roll axis of the first roll enlarges the distance between the first and second roll in order to eject poorly sorted preforms between the first and second roll.

The drive of the roll arrangement modification element can be motorised or pneumatic, where in some aspects motorised activation takes place by means of a toothed rod or toothed belt.

It may be desirable for the roll arrangement modification element to be arranged at the end of the roll sorter device in relation to the transport direction of the preforms in the roll sorter device.

In some aspects, the roll arrangement modification element can be moved along linear guides or by means of linear guides. The linear guides for example run parallel or perpendicular to the rotary axis of the first roll.

According to some aspects of the disclosure, a transport device comprises a roll sorter device as described above, a guide rail arrangement disposed downstream of the roll sorter device, and two opposing guide rails spaced apart. The two guide rails are arranged such that they can hold the preforms transported by the roll sorter device between the guide rails and the preforms tilt in some aspects in a different direction from that in which they were aligned by the roll sorter device.

In various aspects of the disclosure, a sorting method may serve to sort preforms with a roll sorter device which comprises a first roll which can be driven rotatably about its roll axis and a second roll which can be driven rotatably about its roll axis—in particular in an opposite direction to the rotation of the first roll—and which is spaced from the first roll such that the roll axes are arranged substantially parallel to each other. The sorting method comprises the steps of detection of seized and/or faulty preforms on the first and second roll and modification of the arrangement of the first or second roll or at least sections of these rolls to each other when the detection device detects seized preforms.

The invention is described in more detail below with reference to the enclosed drawings and embodiment examples.

DETAILED DESCRIPTION

Figure 1:
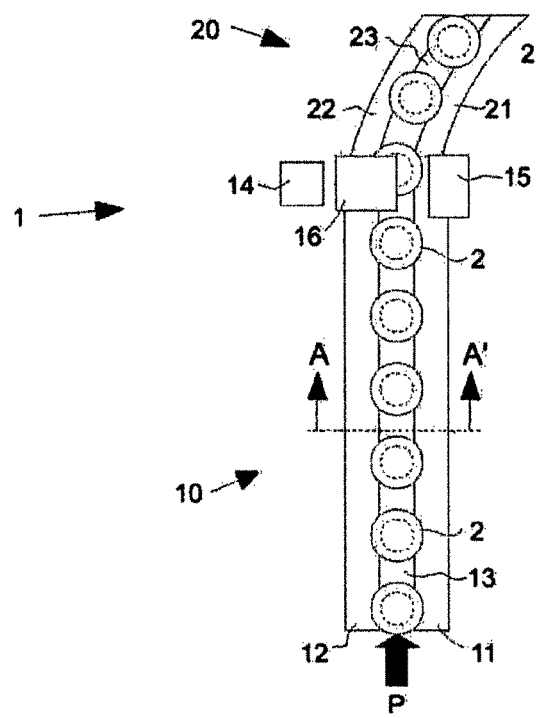
FIG. 1 is a diagrammatic top view of a transport device with a roll sorter device according to a first exemplary embodiment of the present disclosure.

FIG. 1 shows diagrammatically a transport device 1 for transporting preforms 2. The transport device 1 comprises a roll sorter device 10 and a guide rail arrangement 20.

Using the roll sorter device 10, the preforms 2 which are supplied to the transport device 1 initially totally arbitrarily oriented to each other are aligned in a row in succession and in an orientation to each other. Then the preforms 2 are transferred to the guide rail arrangement 20 which tilts the preforms 2 in another direction from when they were aligned by the roll sorter device 10. This allows the arrangement of the roll sorter device 10 to be independent of the arrangement of the container processing plant, such as for example a heating device for heating the preforms 2 which should supply the transport device 1 with the preforms 2.

The roll sorter device 10 comprises two rolls 11, 12, referred to below as the first and second rolls 11, 12, which are arranged next to each other such that they form a gap 13 between them. Also the roll sorter device 10 comprises a detection device 14, a roll arrangement modification element 15 and in some aspects an ejection device 16.

Figure 2:
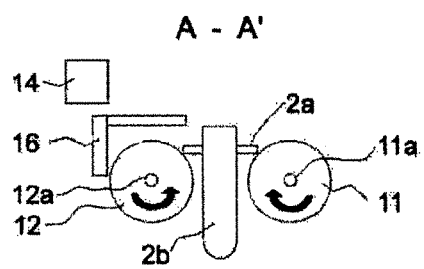
FIG. 2 is a section view of the roll sorter device along section A-A' in FIG. 1.

The first and second rolls 11, 12 have approximately the same dimensions i.e. they are approximately the same length (see FIG. 1) and have approximately the same diameter (see FIG. 2). Also the rolls 11, 12 have a predetermined distance from each other. This means that the rolls 11, 12 form a gap 13 in which the preforms 2 can be held, where as shown in FIG. 2 they lie with their holding ring 2a in the area of their neck at the top on the rolls 11, 12 when the body 2b of the perform 2 protrudes between the rolls 11, 12. Therefore the gap 13 has a width which is smaller than the outer diameter of the neck ring 2a of the preform 2 but longer than the outer diameter of the body 2b of the preform 2. Thus the preforms 2 can be held by their holding ring 2a by the rolls 11, 12, with their body 2b swinging between the rolls 11, 12.

The preforms 2 are aligned by opposing direction rotation of rolls 11, 12 about their roll axes 11a, 12a as indicated by small arrows in FIG. 2 and transported in the transport direction indicated by the thick grey block arrow P in FIG. 1. The opposing rotation of rolls 11, 12 has firstly the function that the preforms 2 cannot be drawn into the roll sorter device 10 and secondly that the preforms 2 are aligned. Also the roll sorting device 10 has the task of expelling seized preforms 2 or preforms 2 which do not meet the quality requirements and thus rejecting them. To this end the roll sorter device 10 comprises a detection device 14 which can detect an accumulation in the roll sorter device 10 caused by wedged or seized preforms 2 and/or the quality of the preforms 2, for example wall thickness, shape etc. If the detection device 15 detects a faulty and/or incorrectly positioned preform 2 and/or an accumulation of preforms 2, it sends a signal which is converted by the roll arrangement modification element 15 into a modification of the arrangement of the first and second rolls 11, 12 to each other.

Figure 3:
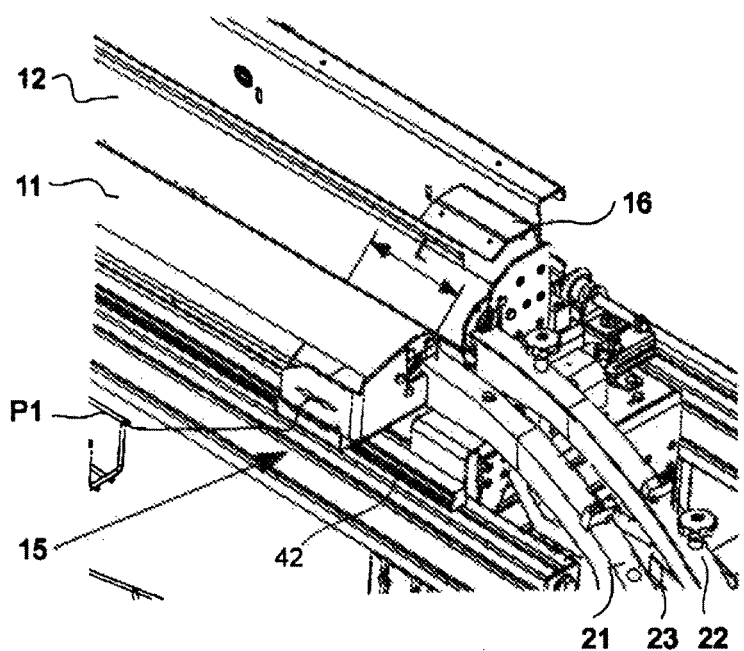
FIG. 3 is a top view onto part of the transport device at the transition between its roll sorter device according to the first exemplary embodiment of the present disclosure and its guide rail arrangement.
Figure 4:
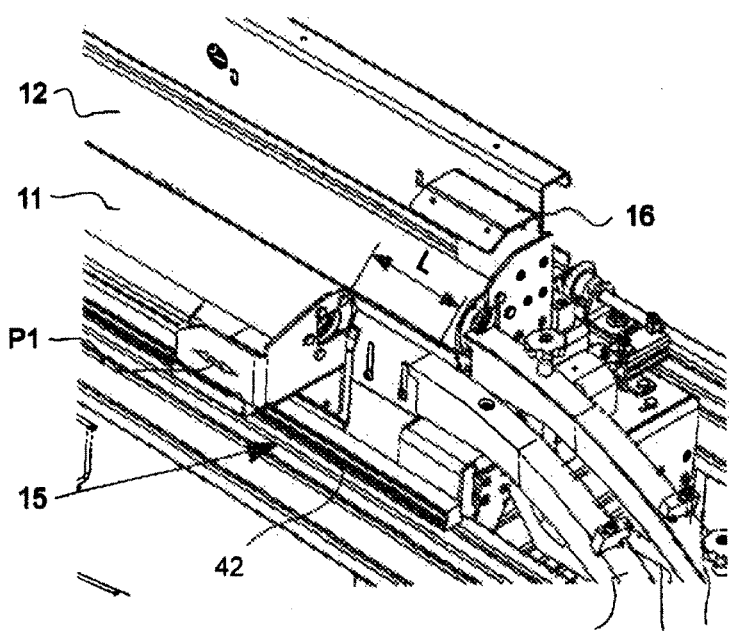
FIG. 4 is a further top view of the part of the transport device shown in FIG. 3.

The roll arrangement modification element 15 according to the first embodiment example is implemented by a drive device which for example offsets the first roll 11 from the position shown in FIG. 3 into the position in FIG. 4 in relation to the second preferably stationary roll 12. This is indicated by the two sided arrow P1 on roll 11 in FIGS. 3 and 4. In other words, in FIG. 4 the first roll 11 is moved back in relation to the second roll 12. More precisely the roll arrangement modification element 15 or drive device draws the entire first roll 11 back from the starting position shown in FIG. 3 linearly in relation to its roll axis 11a so that the first and second rolls 11, 12 are still substantially parallel and have the same spacing, gap 13, as before in relation to each other but the first and second rolls 11, 12 are now arranged offset to each other. In some aspects the movement is executed along the linear guides 42 used.

In other words the preforms 2 are transportable between the first and second rolls 11, 12 in the predetermined transport direction indicated by the thick grey block arrow P in FIGS. 1 and 3. Here the roll arrangement modification element 15 is designed to retract the first or second roll 11, 12 against a predetermined transport direction in order to generate a predetermined space L in the roll sorter device 10. The space created thus enlarges the gap 13 between the rolls and the corresponding preforms 2 are expelled in some aspects by means of gravity.

The roll arrangement modification element 15 can be designed as a drive device such as for example a motorised or pneumatic drive. When motorised, the roll arrangement modification element 15 can be driven for example via a toothed rod or a toothed belt.

A preform 2 can be ejected out of the roll device 10 through the predetermined space L created by offsetting the first roll 11 to the second roll 12 in the roll sorter device 10 in particular using the ejection device 16 shown in FIGS. 1, 3, and 4.

As soon as the seized or poor quality preforms 2 have been expelled from the gap 13 between the first and second rolls 11, 12, the first roll 11 can be reset or returned to the starting position shown in FIG. 3.

Thus the roll sorter device 10 can not only align preforms 2 in a predetermined direction and hence sort all in an established direction, but also sort in relation to quality. Also an accumulation in the roll sorter device 10 caused for example by preforms 2 which are tilted or seized on the rolls 11, 12, can be actively eliminated.

As clear from FIGS. 3 and 4, the roll arrangement modification element 15 is arranged at the end of the roll sorter device 10 i.e. before the guide rail arrangement 20 connects to the roll sorter device 10 downstream. "Downstream" here relates to the flow of preforms 2 in the predetermined transport direction P in the roll sorter device 10. The predetermined transport direction P is also retained in the guide rail arrangement 20.

By disposing the roll arrangement modification element 15 at the end of the roll sorter device 10, the offset or retraction of the first roll 11 in relation to the second roll 12 can be achieved simply. The predetermined space L need only be sufficiently long to be able to eject the preforms 2 to be rejected or expelled. This means that the roll arrangement modification element 15 can be designed such that the length of space L is variable or the first roll 11 can be offset variably in relation to the second roll 12 depending on the state determined by the detection device 14 and the resulting pre-specified requirement.

After running through the roll sorter device 10, the preforms 2 are transferred to the guide rail arrangement 20. As shown in FIGS. 3 and 4, the guide rail arrangement 20 has two guide rails 21, 22 which have a square cross section and which lie spaced from each other like the rolls 11, 12. This means that the two guide rails 21, 22 between them form a gap 23 such that the retaining rings 2a of the preforms 2 slide along the top on the guide rails 21, 22, in particular under the effect of gravity, and their body 2b is swung in the gap 23 between the guide rails 21, 22. The gap 23 of the guide rail arrangement 20 is in some aspects approximately as wide as the gap 13 of the roll sorter device 10.

The guide rails 21, 22 are arranged tilted or curved away from the plane in which the rolls 11, 12 of the roll sorter device 10 are arranged. In this way the two guide rails 21, 22 can tilt the preforms 2 in another direction than when aligned by the roll sorter device 10. As the preforms 2 are already completely aligned and sorted in the roll sorter device 10 according to this embodiment example, no further sorter device in the guide rail arrangement 20 is required.

The roll sorter device 10 according to the second embodiment example has in large parts the same elements as shown in FIGS. 1 and 2. Therefore the same and similar parts in the two embodiment examples are designated with the same reference numerals.

Figure 5:
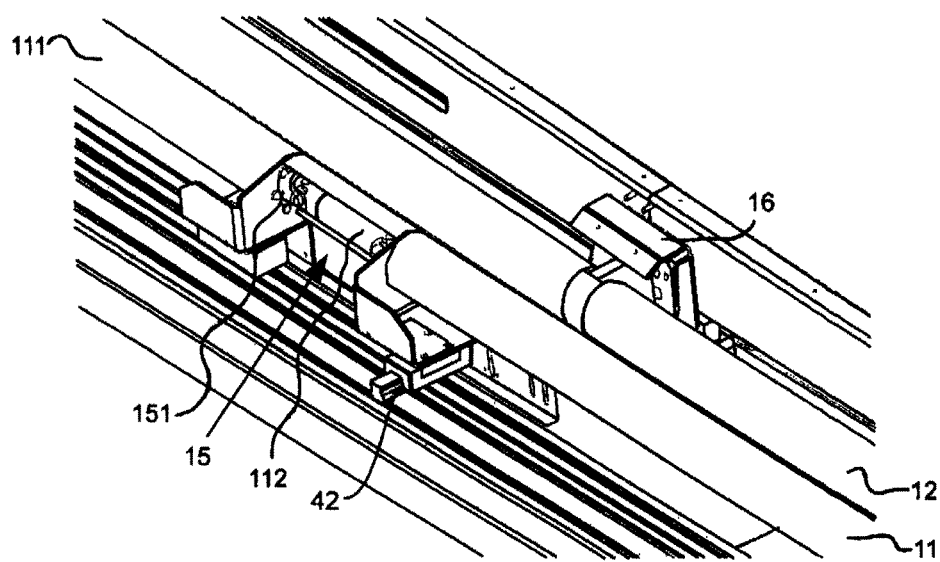
FIG. 5 is a top view of part of a transport device at the transition between its roll sorter device according to a second exemplary embodiment of the present disclosure and its guide rail arrangement.
Figure 6:
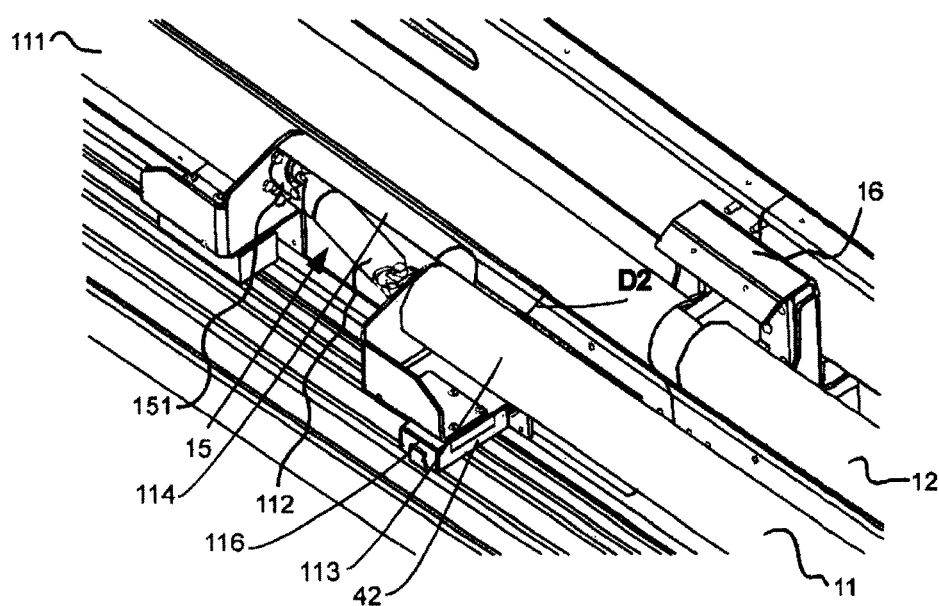
FIG. 6 is a further top view of the part of the transport device shown in FIG. 5.

The difference between the first and second embodiment example is that the roll arrangement modification element 15 in this embodiment example is or has a cardan shaft 151 which swivels a part of the first roll 11 away from the second roll 12. This means that the entire roll 11 can no longer be offset as a whole but only part of the roll 11. Also in this embodiment example the roll modification element 15 can also be fitted centrally in the first roll 11 as shown in FIGS. 5 and 6, although installation at the end of the first roll 11 in similar fashion to the first embodiment example is advantageous in order for example to minimise the number of parts in the roll sorter device 10. Therefore this difference only is described below. Reference numeral 112 indicates a cardan shaft section.

FIGS. 5 and 6 show the roll arrangement modification element 15 according to this embodiment example designed as a cardan shaft 151. The cardan shaft 151 divides the first roll 11 into a first part 111 and a second part 113 when the cardan shaft 151 and the second part 113 are provided at the end of the roll sorter device 10. Also there is a further part of roll 11 as shown in FIGS. 5 and 6. Thus the second part 113 of roll 11 is coupled to the rotation of the first part 111 or the first roll 11. The second part 113 of the first roll 11 can be swivelled away from the second roll 12 by the cardan shaft 151.

Reference numeral 112 indicates a shaft section of the cardan shaft which is set obliquely to move out the second part 113 of roll 11 but transfers torque. The reference numeral 116 relates to a linear guide unit with which the second part 113 of roll 11 can be shifted perpendicular to the rotary axes of the roll.

In other words the first part 111 of the first roll 11 can be driven in rotation about its roll axis 11a by means of the cardan shaft 151 while the second part 113 of the first roll 11 can also be moved on the cardan shaft 151. This creates a greater distance D2 in the roll sorter device 10 between the second part 113 of the first roll 11 and the further roll 12 so that in this way any seized or poor quality preforms 2 can be expelled from the gap 13 between the first and second rolls 11, 12.

The reference numeral 114 relates to a guide element along which the preforms are guided in the area in which the cardan shaft 151 is arranged. This guide element 114 may be arranged stationary i.e. the preforms are here displaced between a rotating roll 12 and the guide element 114. In some aspects, this guide element 114 serves to cover the cardan shaft 151 or in this case the roll modification element 15 in its entirety.

In various aspects, an outer periphery of the guide element 114 is adapted to an outer periphery of the roll 11, so that for example the guide element has a curved surface.

As soon as the seized and/or poor quality preforms 2 are expelled from the gap 13 between the first and second roll 11, 12, the second part 113 swivelled away from the first roll 11 can be swivelled back to the starting position shown in FIG. 5.

The second part 113 of the first roll 11 which can be swivelled out by means of the cardan shaft 151 can be driven motorised or pneumatically by means of a drive device. If motorised the second part 113 of the first roll 11 that can be swivelled out by the cardan shaft 151 can be driven in particular by a toothed rod or a toothed belt.

The roll sorter device 10 according to the third embodiment example has substantially the same parts as shown in the first embodiment example. Therefore the same and similar parts in the two embodiment examples have the same reference numerals.

The difference between the first and third embodiment example is that the roll arrangement modification element 15 in this embodiment example is a unit 152 of the first roll 11 which can only be passed by properly sorted preforms 2, where in contrast poorly sorted preforms 2 are expelled by the unit 152. This means that, as in the second embodiment example, in the third embodiment example, too, the first roll 11 cannot be offset completely in relation to the second roll 12, but only part of the first roll 11 can be offset or modified. Therefore only this difference is described below.

Figure 7A:
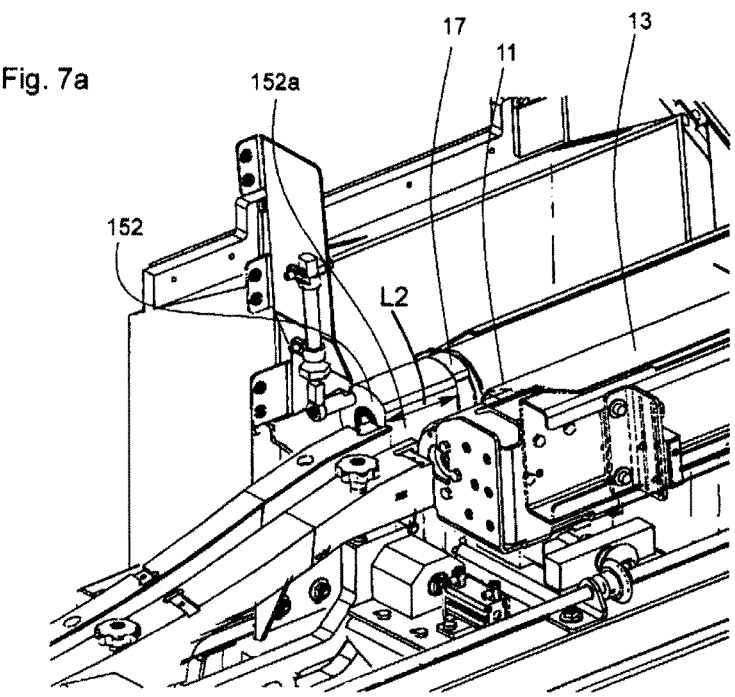
FIGS. 7a-b are two top views of part of a transport device at the transition between its roll sorter device according to a third exemplary embodiment of the present disclosure.
Figure 7B:
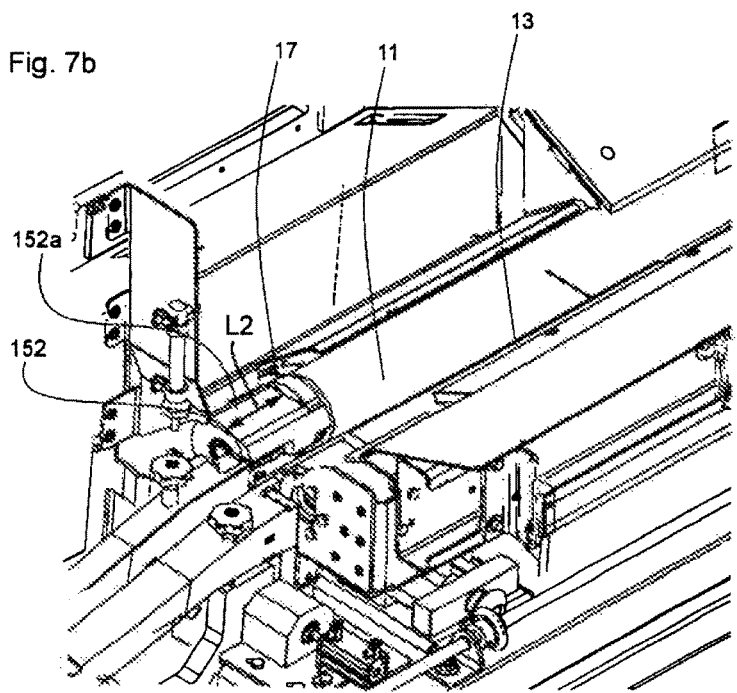

According to FIGS. 7a and 7b, the end of the first roll 11 in the pre-specified transport direction P of the preforms 2 in the roll sorter device 10 is chamfered on one side over a specific length L2. The chamfered part of the first roll part 11 belongs to a unit 152 which essentially has the same diameter as the first roll 11 and is connected to the roll 11. The unit 152 is decoupled from the rotation of the first roll 11. In other words the first roll 11 and the unit 152 can be rotated independently of each other. This can be achieved by the decoupling device 17 shown in FIG. 7.

In normal operation (FIG. 7b), the chamfered area 152a of the unit 152 is turned away from the gap 13 between the rolls. If poorly sorted preforms, i.e. preforms not aligned in the intended manner by the roll sorter device 10 and hence not sorted, are detected, the unit 152 is rotated such that the chamfered area 152a lies opposite roll 12 (FIG. 7a). In this way the gap 13 is increased between the two rolls in the area of the chamfered part 152a so that the preforms can fall down in this area.

The unit 152 is arranged in FIGS. 7a and 7b so that the gap 13 between the first and second rolls 11, 12 in the area of unit 152, apart from the area of the chamfer, is precisely the same width as in the other areas between the rolls 11, 12. If the detection device 14 detects a faulty state or an incorrectly oriented preform, it emits a signal. Consequently, as stated, the unit 152 is rotated by a drive device through a predetermined angle, for example 90°, clockwise in FIG. 7b so that the surface of the first roll 11 formed by the chamfered point 152a stands approximately vertical to the width of the gap 13 (FIG. 7a). In this way the gap 13 is enlarged or widened so that the poorly sorted preforms 2 can be expelled from the gap 13 between the first and second rolls 11, 12.

As soon as the poorly sorted preform 2 has been ejected from the gap 13 between the first and second rolls 11, 12, the unit 152 can be twisted back to the starting position shown in FIG. 7b.

The drive device for the unit 152 can be a separate motor or a belt. Alternatively the drive device can perform the drive pneumatically.

Figure 8A:
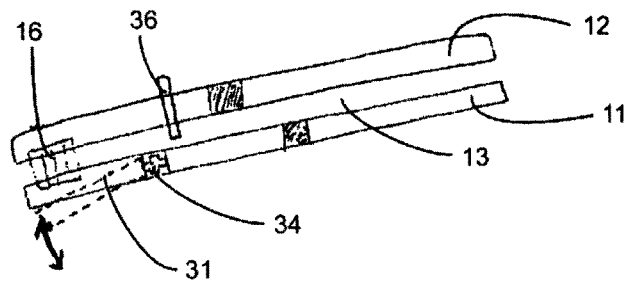
FIGS. 8a-8c illustrate three further embodiments in strictly diagrammatic form.
Figure 8B:
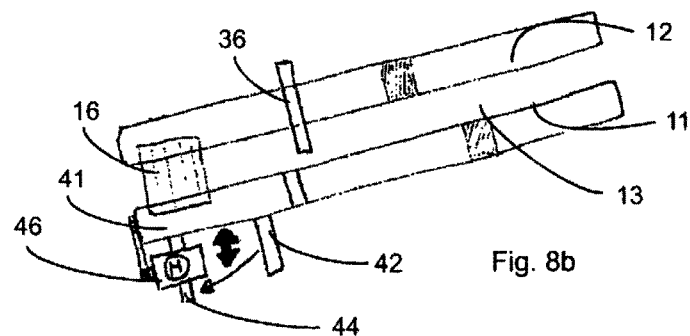
Figure 8C:
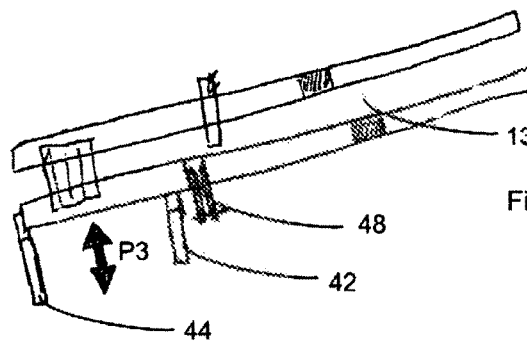

FIGS. 8a-8c depict in highly diagrammatic form three further embodiments of the present disclosure. The depiction in FIG. 8a shows a divided roll 11 with a part 31 that can be swivelled along arrow P2. To this end a pivot connection 34 is provided which can again be a cardan shaft. Thus the roll part 31 rotates at least when folded up i.e. in normal operation. Reference numeral 36 indicates a stop device which aligns incorrectly positioned preforms.

In the embodiment in FIG. 8b, a second roll part 41 is also provided which here can be moved out in its entirety along arrow P, i.e. perpendicular to the transport direction of the preforms, with linear guides 42 and 44. A motor 46 is also provided on linear guide 44 which also turn this roll section 41 in normal operation. Therefore there is no coupling here between roll part 41 and the remaining roll 11 but the rotary movement of the roll part 41 is achieved by the motor 46 also provided on the linear guide 44.

FIG. 8c shows a further embodiment in which the roll part 41 can be moved out by means of two linear guides 42, 44 along arrow P3 in order thus to enlarge the size of gap 13 and expel the preforms. However, here the rotary movement of the roll part 41 is coupled to that of the roll 11 by means of the belt connection 48.

Figure 9:
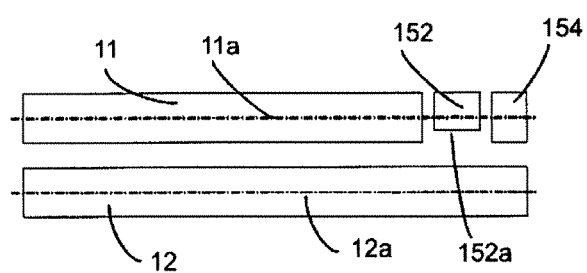
FIG. 9 illustrates a further embodiment of the roll sorter according to the disclosure.

FIG. 9 depicts purely diagrammatically a further embodiment of a roll sorter device. This embodiment is similar to the embodiments shown in FIGS. 7a and 7b and also has a unit 152, rotatable about the rotary axis 11a, with a chamfered point 152a. This rotatable unit 152 is decoupled from the rotation of the first roll 11. In this situation shown in FIG. 9, this rotatable unit is rotated such that the gap between the rolls is enlarged and the plastic preforms can fall out. This rotatable unit 152 is connected to a further cylindrical shaft piece 154 which in some aspects also rotates about rotary axis 11a and whose rotation is in some aspects coupled with the rotation of roll 11. This final cylindrical shaft section 154 can counter the danger of the plastic preforms tilting on discharge from the roll sorter, in particular if the rotatable unit 152 is not aligned totally precisely.

All embodiments of the roll sorter device 10, the transport device 1 described above and the sorting method described above can be used individually or in all possible combinations. In particular the following modifications are conceivable.

The parts indicated in the figures are shown diagrammatically and may deviate in the precise embodiments from the forms shown in the figures as long as their functions described above are guaranteed.

The guide rails 21, 22 can also have the form of an inverted L-shape, wherein the vertical legs of the L's of the two guide rails 21, 22 lie opposite each other. Thus the two guide rails 21, 22 as a whole form a T-shape, the vertical leg of which is formed by the vertical legs of the L's of the guide rails 21, 22 and a gap 23 present between these. Other forms of guide rail are also conceivable as long as they form a gap 23 between them which is suitable for transport of the preforms 2 as described above.

To improve the expulsion of the preforms from the roll sorter device 10 also a stop device not shown can be present before the roll arrangement modification device 10 in order to stop the preforms 2 which follow the preform(s) 2 to be expelled, for the duration of expulsion from the roll sorter device 10.

It will be apparent to those skilled in the art that various modifications and variations can be made to the roll sorter device and sorting method for sorting preforms and transport device with such a roll sorter device of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A roll sorter device for sorting preforms, comprising
a first roll configured to be driven rotatably about its roll axis;
a second roll configured to be driven rotatably about its roll axis in the opposite direction to the rotation of the first roll, the second roll being arranged spaced from the first roll such that their roll axes are arranged substantially parallel to each other;
a detection device configured to detect seized and/or faulty preforms on the first and second rolls; and
a roll arrangement modification element configured to modify the arrangement of the first and second roll to each other when the detection device detects seized preforms.

2. The roll sorter device according to claim 1, wherein the roll arrangement modification element is designed to offset the first and second roll against each other by a predetermined distance.

3. Roll sorter device according to claim 1, wherein the roll arrangement modification unit is designed to swivel a part of the first roll away from the second roll.

4. Roll sorter device according to claim 3, wherein the first roll is sub-divided by means of a cardan shaft into two parts, and wherein one part of the first roll can be driven by means of the cardan shaft in rotation about its roll axis, and another part of the first roll can be swivelled out of the direction its roll axis at the cardan shaft and away from the second roll.

5. The roll sorter device according to claim 1, wherein the first roll has the roll arrangement modification element as a unit designed so that said unit comprises an element chamfered and decoupled from rotation of the first roll.

6. The roll sorter device according to claim 5, wherein the unit is designed such that it enlarges the distance between the first and second rolls by a rotary movement through a predetermined angle in the direction of a rotary movement about the roll axis of the first roll, in order to expel poorly sorted preforms between the first and second rolls.

7. The roll sorter device according to claim 1, wherein the roll arrangement modification element is configured to be driven motorised or pneumatically.

8. The roll sorter device according to claim 7, wherein the motorised activation takes place via a toothed rod or toothed belt.

9. The roll sorter device according to claim 1, wherein the roll sorter arrangement modification element is arranged at the end of the roll sorter device in relation to the transport direction of the preforms in the roll sorter device.

10. The roll sorter device according to claim 1, wherein the roll arrangement modification element is configured to be moved along linear guides.

11. A sorting method for sorting preforms, the method comprising:
rotatably driving a first roll of a roll sorter device about a roll axis of the first roll;
rotatably driving a second roll of a roll sorter device about a roll axis of the second roll, the rotation of the second roll being opposite the rotation of the first roll, the second roll being spaced from the first roll such that the roll axes are arranged substantially parallel to each other; and
upon detection of at least one of a seized preform and a faulty preform on the first and second rolls, modifying an arrangement of the first or second rolls relative to each other.

12. A roll sorter device for sorting preforms, comprising a first roll rotatable about a first roll axis;
a second roll rotatable about a second roll axis, the second roll being rotatable in a direction opposite to the rotation of the first roll, the second roll being spaced from the first roll such that the first and second roll axes are arranged substantially parallel to one other;
a detection device configured to detect at least one of a seized preform and a faulty preform on the first and second rolls; and
a roll arrangement modification element configured to modify an arrangement of the first and second rolls relative to one another when the detection device detects a seized preform.

13. The roll sorter device according to claim 12, wherein the roll arrangement modification element is configured to offset the first and second roll against each other by a predetermined distance.

14. Roll sorter device according to claim 12, wherein the roll arrangement modification unit is configured to swivel a part of the first roll away from the second roll.

15. Roll sorter device according to claim 14, wherein the first roll is sub-divided by means of a cardan shaft into two parts, and wherein one part of the first roll can be driven by means of the cardan shaft in rotation about the first roll axis, and another part of the first roll can be swivelled out of the direction the first roll axis at the cardan shaft and away from the second roll.

16. The roll sorter device according to claim 12, wherein the first roll has the roll arrangement modification element as a unit configured so that said unit comprises an element chamfered and decoupled from rotation of the first roll.

17. The roll sorter device according to claim 16, wherein the unit is configured such that it enlarges the distance between the first and second rolls by a rotary movement through a predetermined angle in the direction of a rotary movement about the first roll axis, in order to expel poorly sorted preforms between the first and second rolls.

18. The roll sorter device according to claim 12, wherein the roll arrangement modification element is configured to be one of motor-driven and pneumatically-driven.

19. The roll sorter device according to claim 12, wherein the roll sorter arrangement modification element is arranged at the end of the roll sorter device in relation to the transport direction of the preforms in the roll sorter device.

20. The roll sorter device according to claim 12, wherein the roll arrangement modification element is movable along linear guides.

21. The roll sorter device according to claim 1, wherein the rolls form a gap in which the preforms are configured to be held, where as the preforms lie with their holding ring in an area of their neck at a top on the rolls when a body of the preforms protrudes between the rolls.

22. The roll sorter device according to claim 1, wherein the rolls form a gap that has a width which is smaller than an outer diameter of a neck ring of the preform but longer than an outer diameter of a body of the preform.

* * * * *